United States Patent
Akiyama

(10) Patent No.: US 10,649,324 B2
(45) Date of Patent: May 12, 2020

(54) ILLUMINATION DEVICE AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/105,399

(22) Filed: Aug. 20, 2018

(65) Prior Publication Data

US 2019/0056646 A1 Feb. 21, 2019

(30) Foreign Application Priority Data

Aug. 21, 2017 (JP) .................................. 2017-158838

(51) Int. Cl.
*G03B 21/20* (2006.01)
*G03B 33/12* (2006.01)

(52) U.S. Cl.
CPC ....... *G03B 21/208* (2013.01); *G03B 21/2013* (2013.01); *G03B 21/2033* (2013.01); *G03B 33/12* (2013.01)

(58) Field of Classification Search
CPC .............. G03B 21/208; G03B 21/2013; G03B 21/2033

See application file for complete search history.

(56) References Cited

U.S. PATENT DOCUMENTS

| | | | | |
|---|---|---|---|---|
| 5,626,409 A * | 5/1997 | Nakayama | ........... | G02B 3/0043 348/E5.141 |
| 5,865,521 A * | 2/1999 | Hashizume | ........ | G02B 27/1026 353/38 |
| 6,254,237 B1 * | 7/2001 | Booth | ................ | G02B 27/1046 348/E9.027 |
| 6,257,726 B1 * | 7/2001 | Okuyama | ............ | G02B 27/283 348/E5.137 |
| 6,846,080 B2 * | 1/2005 | Inoue | ..................... | G03B 33/12 348/E9.026 |
| 8,398,244 B2 * | 3/2013 | Shimizu | ................. | G03B 21/28 353/30 |
| 8,801,189 B2 * | 8/2014 | Mizushima | .......... | G02B 13/007 353/102 |

(Continued)

FOREIGN PATENT DOCUMENTS

JP 2013-65414 A 4/2013

*Primary Examiner* — Mary Ellen Bowman
(74) *Attorney, Agent, or Firm* — Oliff PLC

(57) ABSTRACT

An illumination device includes a first light source section which includes at least one first light emitting element adapted to emit first colored light collimated, and is adapted to emit first light including the first colored light, and a light beam magnifying optical system adapted to magnify the first light. The light beam magnifying optical system includes first through fourth lens surfaces arranged in sequence from an incident side of the first light, the first lens surface is formed of a spherical surface having power, the second lens surface is formed of a first anamorphic surface having power with the same sign as the sign of the power of the first lens surface, the third lens surface is formed of a second anamorphic surface having positive power, and the fourth lens surface is formed of a spherical surface having positive power.

10 Claims, 10 Drawing Sheets

(56) References Cited

U.S. PATENT DOCUMENTS

2006/0023172 A1* 2/2006 Ikeda ................. G02B 27/0961
                                                    353/94
2012/0236264 A1* 9/2012 Akiyama ........... G03B 21/2013
                                                    353/37

* cited by examiner

ILLUMINATION DEVICE AND PROJECTOR

BACKGROUND

1. Technical Field

The present invention relates to an illumination device and a projector.

2. Related Art

There has been proposed an illumination device using a laser element and a phosphor as an illumination device used in, for example, a projector. In JP-A-2013-65414 (Document 1), there is disclosed a projection device provided with an illumination system having a blue laser source, a red laser source, and a green phosphor, liquid crystal panels for respectively modulating the blue light, the red light, and the blue light from the illumination system, and a projection optical system.

In this projection device, the blue light from the blue laser source is branched by a half mirror, and one of the branched blue light beams enters the liquid crystal panel for the blue light, and the other enters a green phosphor as excitation light. The green fluorescence generated by the green phosphor enters the liquid crystal panel for the green light. The red light from the red laser source enters the liquid crystal panel for the red light.

In the projection device according to Document 1, the green light consisting of fluorescence has a Lambert light distribution, and is larger in cross-sectional size than the red light and the blue light respectively consisting of the laser beams. Further, since the blue laser element and the red laser element are generally different in output power from each other, in order to achieve the light intensity balance, it is necessary to make the number of the blue laser elements and the number of the red laser elements different from each other. Therefore, the red light and the blue light are different in the cross-sectional size from each other. When irradiating the display panel with the colored light beams different in cross-sectional size from each other in a converged manner to project an image as described above, there is a problem that color unevenness occurs.

In order to resolve the color unevenness, it is necessary to uniform the cross-sectional sizes of the colored light beams. For example, it is sufficient to increase the cross-sectional size of the colored light beam smaller in cross-sectional size so as to coincide with that of the other colored light beam. Further, in the case of illuminating the liquid crystal panels using the illumination devices, it is necessary to adjust the cross-sectional size and the cross-sectional shape of each of the colored light beams in accordance with the shape and the size of the liquid crystal panel. However, if the optical system for adjusting the cross-sectional size of the light beam and the optical system for adjusting the cross-sectional shape of the light beam are disposed in series, there is a problem that the illumination device grows in size.

SUMMARY

An advantage of some aspects of the invention is to provides an illumination device small in size and capable of adjusting the cross-sectional size and the cross-sectional shape of the light beam. Another advantage of some aspects of the invention is to provide a projector equipped with the illumination device described above.

An illumination device according to an aspect of the invention includes a first light source section which includes at least one first light emitting element adapted to emit first colored light collimated, and is adapted to emit first light including the first colored light, and a light beam magnifying optical system adapted to magnify the first light. The light beam magnifying optical system includes a first lens surface, a second lens surface, a third lens surface, and a fourth lens surface disposed in sequence from an incident side of the first light, the first lens surface is formed of a spherical surface having power, the second lens surface is formed of a first anamorphic surface having power with the same sign as a sign of the power of the first lens surface, the third lens surface is formed of a second anamorphic surface having positive power, and the fourth lens surface is formed of a spherical surface having positive power.

In the light beam magnifying optical system according to the aspect of the invention, the first lens surface and the fourth lens surface both formed of the spherical surface have a function of adjusting the cross-sectional size of the light, namely a function as an afocal optical system. Further, the second lens surface and the third lens surface both formed of an anamorphic surface have a function of adjusting the cross-sectional shape of the light, namely a function as a shape conversion optical system. It should be noted that in the specification, the "cross-section of light" means a "cross-section perpendicular to a principal ray of the light."

Specifically, in the light beam magnifying optical system, the second lens surface and the fourth lens surface constituting the shape conversion optical system are disposed between the first lens surface and the fourth lens surface constituting the afocal optical system. Therefore, the illumination device can be made smaller in size compared to the case in which the afocal optical system and the optical system for adjusting the cross-sectional shape are arranged in series to each other. Thus, it is possible to provide a small-sized illumination device capable of adjusting the cross-sectional size and the cross-sectional shape of the light.

In the illumination device according to the aspect of the invention, the first anamorphic surface may be formed of a first cylindrical surface, and the second anamorphic surface may be formed of a second cylindrical surface.

According to this configuration, the cost of the illumination device can be reduced.

In the illumination device according to the aspect of the invention, the first light emitting element may include a semiconductor laser element, and a generatrix of the first cylindrical surface and a generatrix of the second cylindrical surface may be parallel to a short-side direction of a light emitting area of the semiconductor laser element.

In general, the cross-sectional shape of the light emitted from the semiconductor laser element is an elliptical shape. However, according to this configuration, it is possible to make the cross-sectional shape of the first light closer to a circular shape compared to the case in which the short-side direction of the light emitting area of the semiconductor laser element is perpendicular to the generatrix of the first cylindrical lens and the generatrix of the second cylindrical lens.

In the illumination device according to the aspect of the invention, the light beam magnifying optical system may include a first lens having the first lens surface and the second lens surface, and a second lens having the third lens surface and the fourth lens surface.

According to this configuration, the illumination device can be made smaller in size compared to the case in which the first through fourth lens surfaces are respectively provided to lenses separated from each other.

The illumination device according to the aspect of the invention may further include a second light source section which has a plurality of second light emitting elements adapted to emit second colored light different in color from the first colored light, and may be adapted to emit second light collimated and including the second colored light. In this case, the number of the second light emitting elements may be larger than the number of the first light emitting elements, the second light may be larger in cross-sectional size than the first light, and the light beam magnifying optical system may have a function of increasing the cross-sectional size of the first light so that a difference in cross-sectional size between the second light and the first light in a posterior stage of the light beam magnifying optical system is smaller than a difference in cross-sectional size between the second light and the first light in an anterior stage of the light beam magnifying optical system.

According to this configuration, the first light and the second light having the small difference in cross-sectional size are emitted from the illumination device.

The illumination device according to the aspect of the invention may further include a first light beam combining optical system having a function of combining the first light having been transmitted through the light beam magnifying optical system and the second light, and a diffusion element where light emitted from the first light beam combining optical system enters.

According to this configuration, it is not necessary to provide separate diffusion elements corresponding respectively to the first light and the second light. Further, it is possible to obtain the illumination light with little color unevenness caused by the first light and the second light.

A projector according to another aspect of the invention includes the illumination device according to the aspect of the invention, a light modulation section adapted to modulate the first light from the illumination device in accordance with image information to thereby form image light, and a projection optical system adapted to project the image light.

The projector according to the aspect of the invention is provided with a small-sized illumination device, and is therefore easily miniaturized.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described using FIG. 1 through FIG. 12.

A projector according to the present embodiment is an example of a liquid crystal projector equipped with a light source device using a semiconductor laser.

It should be noted that in each of the following drawings, the constituents are shown with the scale ratios of respective sizes set differently between the constituents in some cases in order to facilitate the visualization of each of the constituents.

Figure 1:
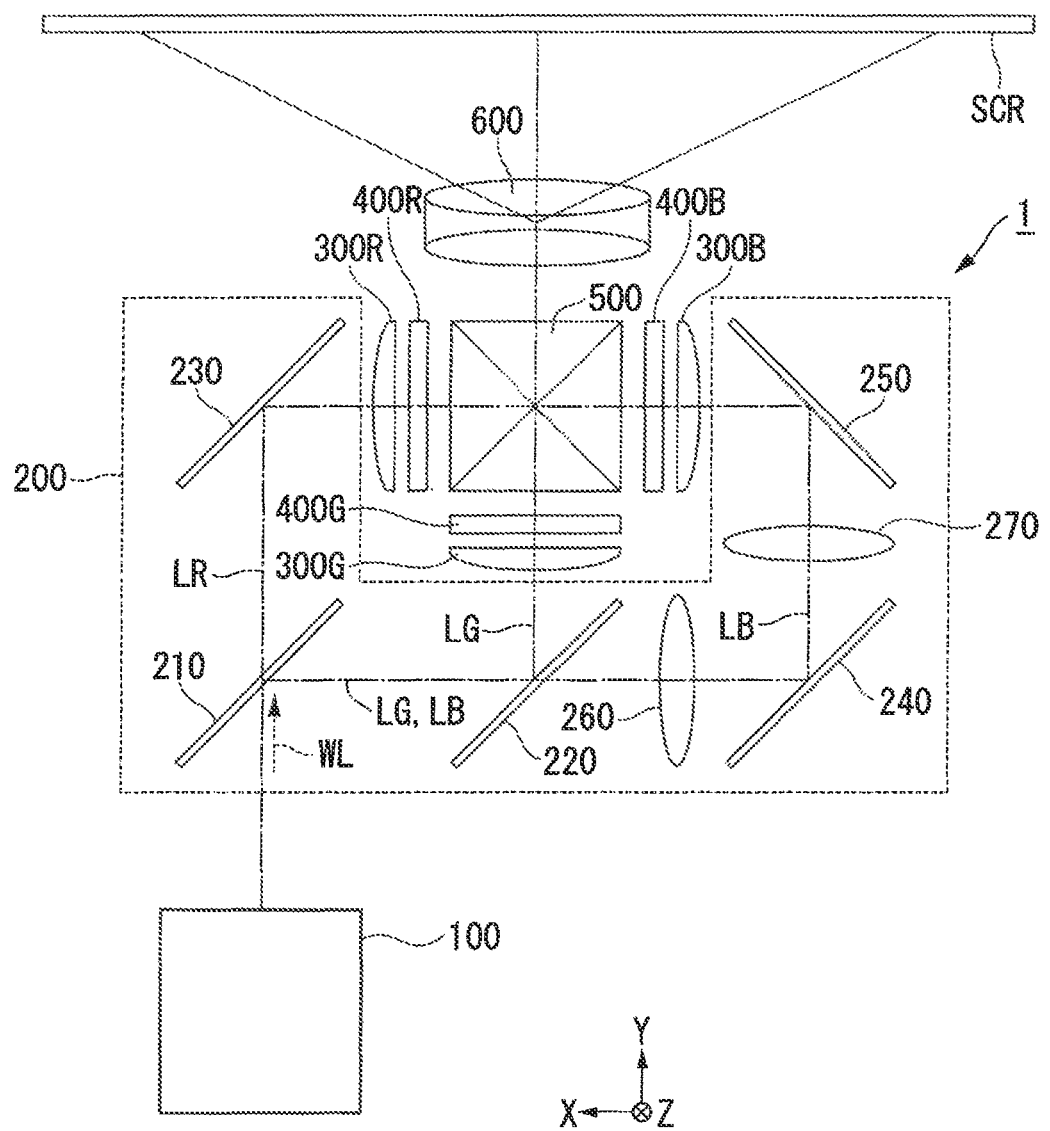
FIG. 1 is a schematic configuration diagram of a projector according to a first embodiment of the invention.

FIG. 1 is a schematic configuration diagram of the projector 1 according to the present embodiment.

As shown in FIG. 1, the projector 1 is provided with an illumination device 100, a color separation light guide optical system 200, a red-light light modulation device 400R, a green-light light modulation device 400G, a blue-light light modulation device 400B, a cross dichroic prism 500, and a projection optical system 600. The red-light light modulation device 400R, the green-light light modulation device 400G, and the blue-light light modulation device 400B of the present embodiment correspond to a light modulation section of the appended claims.

In the present embodiment, the illumination device 100 emits white illumination light WL including red light LR, green light LG, and blue light LB.

The color separation light guide optical system 200 is provided with a dichroic mirror 210, a dichroic mirror 220, a reflecting mirror 230, a reflecting mirror 240, a reflecting mirror 250, a relay lens 260, and a relay lens 270. The color separation light guide optical system 200 separates the illumination light WL from the illumination device 100 into the red light LR, the green light LG, and the blue light LB, and guides the red light LR, the green light LG, and the blue light LB to the red-light light modulation device 400R, the green-light light modulation device 400G, and the blue-light light modulation device 400B corresponding respectively to the red light LR, the green light LG, and the blue light LB.

Between the color separation light guide optical system 200 and the red-light light modulation device 400R, there is disposed a field lens 300R. Between the color separation light guide optical system 200 and the green-light light modulation device 400G, there is disposed a field lens 300G. Between the color separation light guide optical system 200 and the blue-light light modulation device 400B, there is disposed a field lens 300B.

The dichroic mirror 210 transmits the red light LR, while reflecting the green light LG and the blue light LB. The dichroic mirror 220 reflects the green light LG, while transmitting the blue light LB. The reflecting mirror 230 reflects the red light LR. The reflecting mirror 240 and the reflecting mirror 250 reflect the blue light LB.

Each of the red-light light modulation device 400R, the green-light light modulation device 400G, and the blue-light light modulation device 400B is formed of a liquid crystal panel for modulating the incident colored light in accordance with image information to form an image.

It should be noted that although not shown in the drawings, between the field lens 300R and the red-light light modulation device 400R, there is disposed an incident side polarization plate. Between the field lens 300G and the green-light light modulation device 400G, there is disposed an incident side polarization plate. Between the field lens 300B and the blue-light light modulation device 400B, there is disposed an incident side polarization plate. Between the red-light light modulation device 400R and the cross dichroic prism 500, there is disposed an exit side polarization plate. Between the green-light light modulation device 400G and the cross dichroic prism 500, there is disposed an exit side polarization plate. Between the blue-light light modulation device 400B and the cross dichroic prism 500, there is disposed an exit side polarization plate.

The cross dichroic prism 500 combines the image light emitted from the red-color light modulation device 400R, the image light emitted from the green-color light modulation device 400G, and the image light emitted from the blue-color light modulation device 400B with each other to form a color image. The cross dichroic prism 500 has a substantially rectangular planar shape formed of four rectangular prisms bonded to each other, and on the substantially X-shaped interfaces on which the rectangular prisms are bonded to each other, there are formed dielectric multilayer films.

The color image having been emitted from the cross dichroic prism 500 is projected on a screen SCR by the projection optical system 600 in an enlarged manner.

Figure 2:
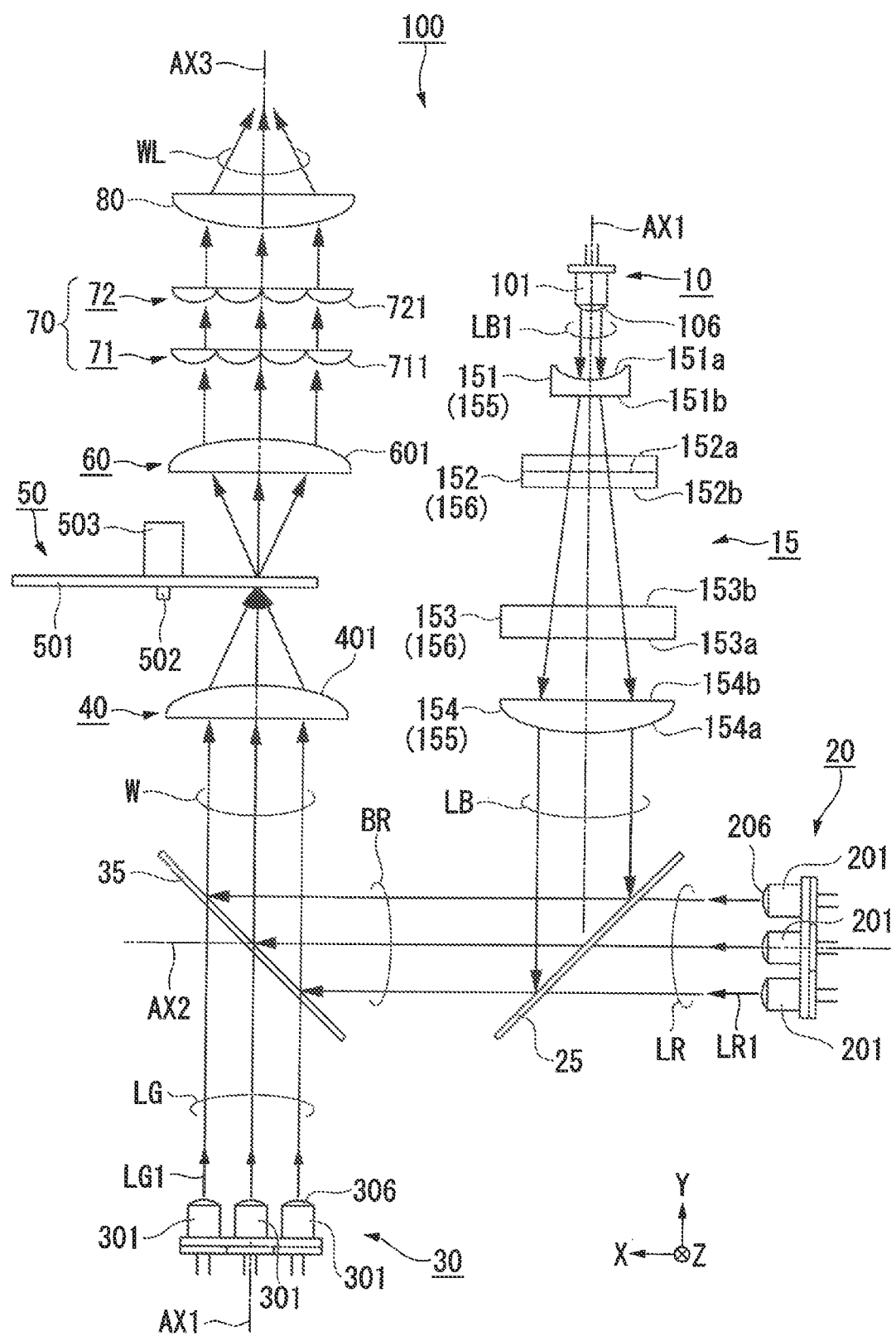
FIG. 2 is a schematic configuration diagram of an illumination device according to the first embodiment.
Figure 3:
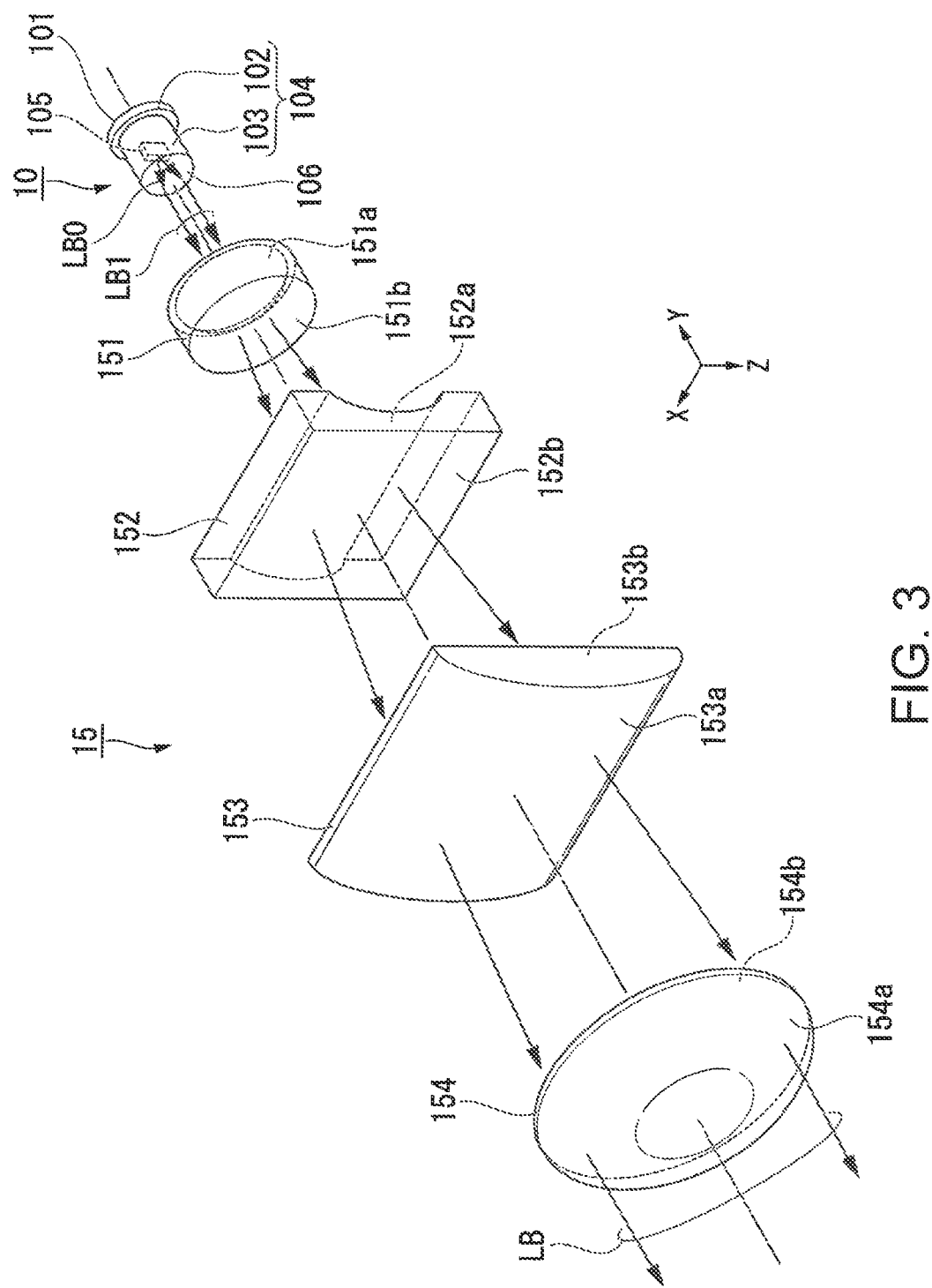
FIG. 3 is a perspective view of a first light source section and a light beam magnifying optical system.

FIG. 2 is a schematic configuration diagram of the illumination device 100. FIG. 3 is a perspective view of a first light source section 10 and a light beam magnifying optical system 15.

In the following description, there is used a Cartesian coordinate system defining a direction in which the illumination light WL is emitted from the illumination device 100 as a Y direction, a direction in which the red light LR is emitted from a second light source section 20 as an X direction, and a direction from the front to the back of the sheet, and perpendicular to the X direction and the Y direction as a Z direction.

As shown in FIG. 2, the illumination device 100 is provided with the first light source section 10, the light beam magnifying optical system 15, the second light source section 20, a first light beam combining optical system 25, a third light source section 30, a light beam combining element 35, a light collection optical system 40, a diffusion element 50, a pickup optical system 60, an integrator optical system 70, and an overlapping lens 80.

The first light source section 10, the light beam magnifying optical system 15, and the first light beam combining optical system 25 are disposed on an optical axis AX1. The second light source section 20, the first light beam combining optical system 25, and the light beam combining element 35 are disposed on an optical axis AX2 perpendicular to the optical axis AX1. The third light source section 30, the light beam combining element 35, the light collection optical system 40, the diffusion element 50, the pickup optical system 60, the integrator optical system 70, and the overlapping lens 80 are disposed on an optical axis AX3 parallel to the optical axis AX1.

As shown in FIG. 3, the first light source section 10 is provided with a single first light emitting element 101. The first light emitting element 101 is formed of a CAN package-type semiconductor laser. The first light emitting element 101 is provided with a package 104 formed of a pedestal 102 and a can body 103, a first semiconductor laser element 105 housed in the package 104, and a collimating lens 106. The first semiconductor laser element 105 emits, for example, a blue light beam LB0 having a peak wavelength in a range of 460 through 480 nm. In a light exit port of the package 104, there is disposed the collimating lens 106. The collimating lens 106 roughly collimates the blue light beam LB0 emitted from the first semiconductor laser element 105. It should be noted that the blue light beam LB0 thus collimated is referred to as a blue light beam LB1. As described above, the first light emitting element 101 emits the collimated blue light beam LB1. The blue light beam LB1 corresponds to first colored light and first light described in the appended claims.

It should be noted that the first light source section 10 can also be provided with a plurality of the first light emitting elements 101. In the case in which the first light source section 10 is provided with the plurality of first light emitting elements 101, a plurality of the blue light beams LB1 is emitted from the first light source section 10. The principal rays of the respective blue light beams LB1 are parallel to each other. In this case, the blue light beam LB1 corresponds to first colored light described in the appended claims, and a bundle of the plurality of blue light beams LB1 corresponds to first light described in the appended claims.

As shown in FIG. 2 and FIG. 3, the light beam magnifying optical system 15 includes a first lens surface 151a, a second lens surface 152a, a third lens surface 153a, and a fourth lens surface 154a disposed in sequence from the incident side of the blue light beam LB1. Further, the light beam magnifying optical system 15 is provided with a first lens 151, a second lens 152, a third lens 153, and a fourth lens 154 disposed in sequence from the incident side of the blue light beam LB1. The first lens surface 151a is provided to the first lens 151. The second lens surface 152a is provided to the second lens 152. The third lens surface 153a is provided to the third lens 153. The fourth lens surface 154a is provided to the fourth lens 154. The blue light beam LB1 having been transmitted through the light beam magnifying optical system 15 corresponds to the blue light LB.

The first lens 151 is constituted by a plano-concave lens having the first lens surface 151a formed of a concave surface and a plane 151b. Further, the first lens surface 151a is formed of a spherical surface having negative power.

The second lens 152 is constituted by a plano-concave lens having the second lens surface 152a formed of a concave surface and a plane 152b. Further, the second lens surface 152a is formed of a first anamorphic surface having negative power. In other words, the sign of the power of the second lens surface 152a is the same as the sign of the power of the first lens surface 151a. Further, the first anamorphic surface is formed of a first cylindrical surface.

The third lens 153 is constituted by a plano-convex lens having the third lens surface 153a formed of a convex surface and a plane 153b. Further, the third lens surface 153a is formed of a second anamorphic surface having positive power. Further, the second anamorphic surface is formed of a second cylindrical surface.

The generatrix direction of the first cylindrical surface and the generatrix direction of the second cylindrical surface are parallel to the X-axis direction.

The fourth lens 154 is constituted by a plano-convex lens having the fourth lens surface 154a formed of a convex surface and a plane 154b. Further, the fourth lens surface 154a is formed of a spherical surface having positive power.

In this configuration, the first lens 151 and the fourth lens 154 constitute an afocal optical system 155. The afocal optical system 155 adjusts the cross-sectional size of the blue light beam LB1 so that the cross-sectional size of the blue light beam LB1 increases. Specifically, the blue light LB in the posterior stage of the light beam magnifying optical system 15 is larger in cross-sectional size than the blue light beam LB1 in the anterior stage of the light beam magnifying optical system 15.

The second lens 152 and the third lens 153 constitute a shape conversion optical system 156. The shape conversion optical system 156 will be described later in detail, but the shape conversion optical system 156 adjusts the cross-sectional shape of the blue light beam LB1. In the light beam magnifying optical system 15, the shape conversion optical system 156 is disposed between the first lens 151 and the fourth lens 154 constituting the afocal optical system 155. As described above, the illumination device 100 is smaller in size than an illumination device having the afocal optical system and an optical system for adjusting the cross-sectional shape arranged in series to each other.

It should be noted that in the present specification, in the case in which light consists of a plurality of light beams, the cross-sectional size of the light is defined as the diameter of a minimum circle including all of the cross-sections of the respective light beams. In the case in which light consists of a single light beam, the cross-sectional size of the light is defined as the diameter of a minimum circle including the cross-section of the light.

Figure 4:
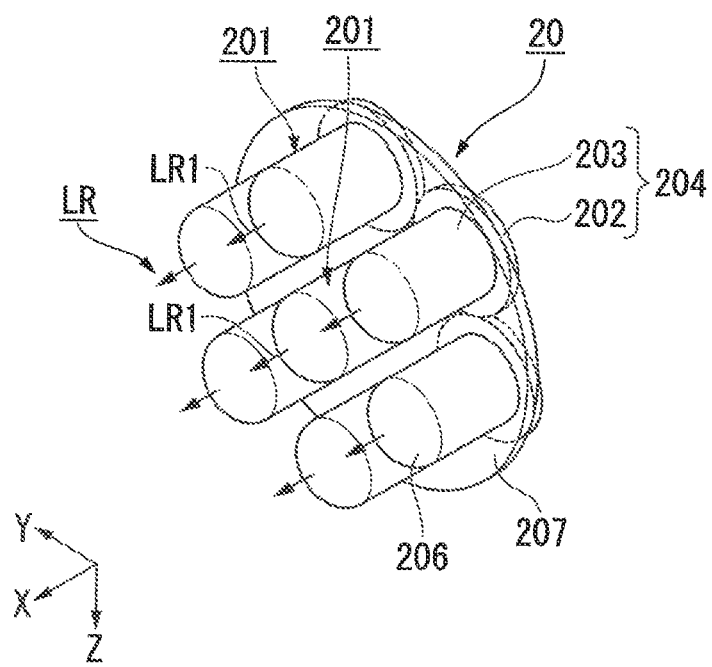
FIG. 4 is a perspective view of a second light source section.
Figure 5:
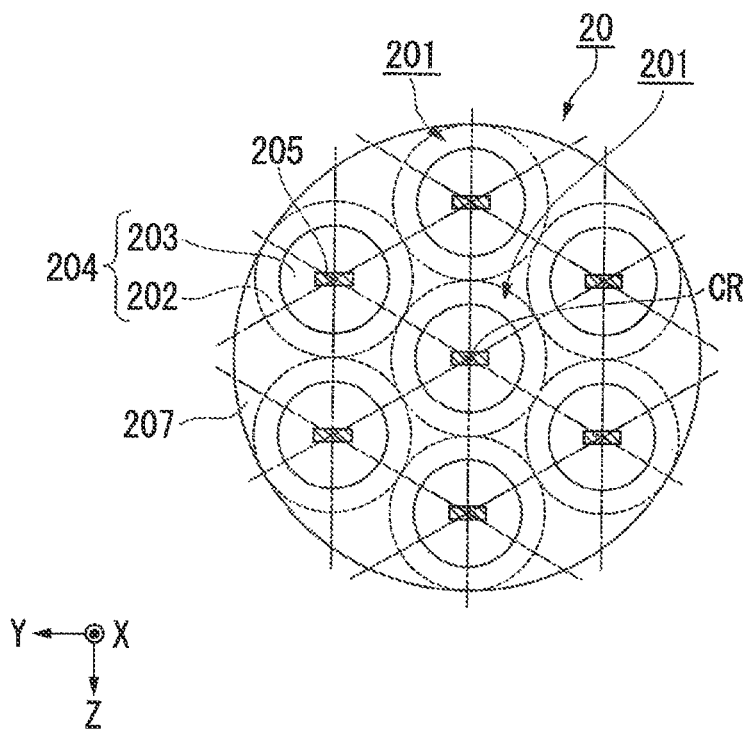
FIG. 5 is a side view of the second light source section viewed from a −X direction.

FIG. 4 is a perspective view of the second light source section 20. FIG. 5 is a side view of the second light source section 20 viewed from the –X direction. It should be noted that the configuration of the third light source section 30 is substantially the same as the configuration of the second light source section 20. Therefore, regarding the second light source section 20 and the third light source section 30, the detailed configuration will be described using the second light source section 20 as a representative, and the description of the third light source section 30 will be omitted.

As shown in FIG. 4 and FIG. 5, the second light source section 20 is provided with a plurality of second light emitting elements 201. In the present embodiment, the second light source section 20 is provided with seven second light emitting elements 201. The seven second light emitting elements 201 include the single second light emitting element 201 located at the center, and the six second light emitting elements 201 disposed so as to surround the single second light emitting element 201. As described above, the six second light emitting elements 201 located on the periphery are disposed so as to substantially be rotationally symmetric around the central axis CR of the red light LR. The seven second light emitting elements 201 are supported by a support member 207.

The second light emitting elements 201 are each formed of a CAN package-type semiconductor laser. The second light emitting element 201 is provided with a package 204 formed of a pedestal 202 and a can body 203, a second semiconductor laser element 205 housed in the package 204, and a collimating lens 206. The second semiconductor laser element 205 emits (see FIG. 9), for example, a red light beam LR0 having a peak wavelength in a range of 610 through 680 nm. In the light exit port of the package 204, there is disposed the collimating lens 206. The collimating lens 206 roughly collimates the red light beam LR0 emitted from the second semiconductor laser element 205. It should be noted that the red light beam LR0 thus collimated is referred to as a red light beam LR1.

As described above, the second light emitting element 201 emits the collimated red light beam LR1. The second light source section 20 emits the red light LR consisting of the seven red light beams LR1 different in color from the blue light beam LB1 (the first colored light). The principal rays of the respective red light beams LR1 are parallel to each other. The red light beam LR1 of the present embodiment corresponds to second colored light in the appended claims. The red light LR of the present embodiment corresponds to second light in the appended claims.

As shown in FIG. 2, the first light beam combining optical system 25 combines the red light LR and the blue light LB from the light beam magnifying optical system 15 with each other to generate light BR. The first light beam combining optical system 25 is constituted by a dichroic mirror for transmitting the red light LR, and reflecting the blue light LB. The dichroic mirror is disposed so as to form an angle of 45° with respect to each of the optical axis AX1 and the optical axis AX2.

The third light source section 30 is provided with seven third light emitting elements 301. Similarly to the configuration of the second light source section 20 shown in FIG. 4 and FIG. 5, in the configuration of the third light source section 30, the six third light emitting elements 301 are disposed so as to surround the single third light emitting element 301 and so as to substantially be rotationally symmetric.

The third light emitting elements 301 are each formed of a CAN package-type semiconductor laser. Similarly to the second light emitting element 201, the third light emitting element 301 is provided with a package, a third semiconductor laser element 305 housed in the package, and a collimating lens 306 (see FIG. 10). The third semiconductor laser element 305 emits, for example, a green light beam LG0 having a peak wavelength in a range of 500 through 590 nm. In the light exit port of the package, there is disposed the collimating lens 306. The collimating lens 306 roughly collimates the green light beam LG0 emitted from the third semiconductor laser element 305. It should be noted that the green light beam LG0 thus collimated is referred to as a green light beam LG1.

As described above, the third light emitting element 301 emits the collimated green light beam LG1. The principal rays of the respective green light beams LG1 are parallel to each other. The third light source section 30 emits the green light LG consisting of the seven green light beams LG1 different in color from the blue light beam LB1.

The light beam combining element 35 combines the green light GL and the light BR with each other. The light beam combining element 35 is constituted by a dichroic mirror for transmitting the green light LG and reflecting the light BR. The dichroic mirror is disposed so as to form an angle of 45° with respect to each of the optical axis AX2 and the optical axis AX3. Thus, the white light W obtained by combining the blue light LB, the red light LR, and the green light LG with each other is emitted from the light beam combining element 35.

Since the light emission efficiency of the semiconductor laser element differs by the emission color, the optical output of the semiconductor laser element also differs by the emission color. The light emission efficiency of the blue semiconductor laser element is higher than the light emission efficiency of the green semiconductor laser element and the light emission efficiency of the red semiconductor laser element. Therefore, the optical output of the blue semiconductor laser element is higher than the optical output of the green semiconductor laser element and the optical output of the red semiconductor laser element.

It should be noted that in the case in which a single semiconductor laser is provided with a plurality of semiconductor laser elements, the optical output of the semiconductor laser is equal to the sum of the optical outputs of the plurality of semiconductor laser elements.

Showing an example, according to NICHIA Corporation, home page, products information, "laser diode (LD)," [online], [searched on Jun. 14, 2017], the Internet <URL: http://www.nichia.co.jp/jp/product/laser.html>, the optical output of the blue semiconductor laser (model number: NDB7K75) is, for example, 3.5 W (25° C.), and the optical output of the green semiconductor laser (model number: NDG7K75T) is, for example, 1 W (25° C.). Although not described in the home page described above, the blue semiconductor laser array of the model number: NUBM08-02 is provided with a plurality of blue semiconductor lasers each having the optical output of 4.5 W (25° C.).

According to Mitsubishi Electric Corporation, home page, News Releases, "Mitsubishi Electric to Launch High-power 639-nm Red Laser Diode for Projectors," [online], [searched on Jun. 14, 2017], the Internet <URL: http://www.mitsubishielectric.co.jp/news/2016/1214.html>, the optical output of the red semiconductor laser (model number: ML562G85) is, for example, 2.1 W (25° C.).

Converting the optical outputs at the temperature of 25° C. described above into the optical outputs at the actual operating temperature of 45° C., the optical outputs of the semiconductor lasers of the respective colors are as listed in Table 1 below.

TABLE 1

| | COLOR | | | |
|---|---|---|---|---|
| | R | G | B | B |
| | MODEL NUMBER | | | |
| | ML562G85 | NDG7K75T | NDB7K75 | NUBM08-02 |
| CENTER WAVELENGTH | 640 | 520 | 455 | 450 |
| OPTICAL OUTPUT OF SINGLE LD [W/UNIT] | 1.26 | 0.8 | 2.8 | 4.1 |

Specifically, the optical output of the single blue semiconductor laser (model number: NDB7K75) is 2.8 W, the optical output of the single blue semiconductor laser provided to the blue semiconductor laser array (model number: NUBM08-02) is 4.1 W, the optical output of the single green semiconductor laser (model number: NDG7K75T) is 0.8 W, and the optical output of the single red semiconductor laser (model number: ML562G85) is 1.26 W.

Meanwhile, the optical outputs of the respective semiconductor lasers necessary for obtaining the white light with the luminance of each of 1000 lm, 2000 lm, and 3000 lm, and the numbers of the respective semiconductor lasers necessary for obtaining the white light described above are as listed in Table 2 below.

TABLE 2

| NECESSARY OPTICAL OUTPUT [W] | | | NUMBER OF NECESSARY SEMICONDUCTOR LASERS | | |
|---|---|---|---|---|---|
| PRODUCT LUMINANCE [lm] | R | G | B | R | G | B |
| 3000 | 8.7 | 6.1 | 3.7 | 8 | 9 | 1 |
| 2000 | 5.83 | 4.06 | 2.46 | 6 | 6 | 1 |
| 1000 | 2.92 | 2.03 | 1.23 | 3 | 3 | 1 |

As shown in Table 2, for example, the optical outputs of the respective semiconductor lasers necessary for obtaining the white light having the luminance of 2000 lm are 2.46 W in the blue semiconductor laser, 4.06 W in the green semiconductor laser, and 5.83 W in the red semiconductor laser. Calculating with the optical output values and the optical output per semiconductor laser, the minimum numbers of the semiconductor lasers necessary for obtaining the white light with the luminance of 2000 lm are one blue-light semiconductor laser (model number: NDB7K75), six green-light semiconductor lasers, and six red-light semiconductor lasers. Therefore, the illumination device 100 according to the present embodiment is capable of emitting the white light having the luminance up to at least 2000 lm. It should be noted that in Table 2, with respect to the luminance of 3000 lm, there is used one blue semiconductor laser provided to the blue semiconductor laser array (model number: NUBM08-02).

According to an inference of the inventors, although in the future, there is a possibility that the optical outputs of the respective semiconductor lasers increase to levels higher than the numerical values described above due to the advancement of the semiconductor laser technology, the proportion of the numbers of the respective semiconductor lasers necessary for obtaining the white light is invariable. Therefore, although the illumination device 100 according to the present embodiment is provided with the one first light emitting element 101 constituted by the blue semiconductor laser, the seven second light emitting elements 201 each constituted by the red semiconductor laser, and the seven third light emitting elements 301 each constituted by the green semiconductor laser, the numbers of the respective light emitting elements 101, 201, 301 are not limited to this example.

The light collection optical system 40 collects the white light W emitted from the light beam combining element 35, and then makes the white light W thus collected enter the diffusion element 50. The light collection optical system 40 is formed of a convex lens 401.

The diffusion element 50 is provided with a diffusion plate 501, and a motor 503 for rotating the diffusion plate 501 around a rotary shaft 502. The diffusion element 50 diffuses the white light W having entered the diffusion plate 501.

The pickup optical system 60 roughly collimates the white light W having been emitted from the diffusion element 50. The pickup optical system 60 is formed of a convex lens 601.

The integrator optical system 70 is provided with a first lens array 71, and a second lens array 72. The first lens array 71 has a plurality of lenses 711 for dividing the white light W having been emitted from the pickup optical system 60 into a plurality of partial light beams. The plurality of lenses 711 is arranged in a matrix in a plane perpendicular to the optical axis AX3.

The second lens array 72 is provided with a plurality of lenses 721 corresponding respectively to the lenses 711 of the first lens array 71. The second lens array 72 superimposes the images of the respective lenses 711 of the first lens array 71 in the vicinity of the image forming area of each of the red-light light modulation device 400R, the green-light light modulation device 400G, and the blue-light light modulation device 400B in cooperation with the overlapping lens 80. The plurality of lenses 721 is arranged in a matrix in a plane perpendicular to the optical axis AX3.

Figure 8:
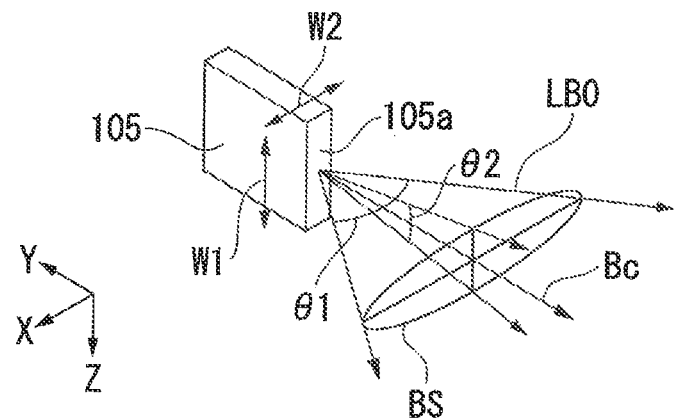
FIG. 8 is a perspective view of a semiconductor laser element.

FIG. 8 is a perspective view of the first semiconductor laser element 105.

As shown in FIG. 8, the first semiconductor laser element 105 has a light emitting area 105a for emitting the blue light beam LB0. The planar shape of the light emitting area 105a is a roughly rectangular shape having a longitudinal direction W1 and a short-side direction W2 viewed from the direction of the principal ray Bc of the light. The shapes of the second semiconductor laser elements 205 and the third semiconductor laser elements 305 are substantially the same as those of the first semiconductor laser element 105.

In the first semiconductor laser element 105, the longitudinal direction W1 of the light emitting area 105a coincides with the Z direction, and the short-side direction W2 of the light emitting area 105a coincides with the X direction.

The blue light beam LB0 emitted from the first semiconductor laser element 105 is linearly polarized light having a polarization direction parallel to the longitudinal direction W1. The diffusion angle θ1 of the blue light beam LB0 in the short-side direction W2 is larger than the diffusion angle θ2 of the blue light beam LB0 in the longitudinal direction W1. Thus, the cross-sectional shape BS of the blue light beam LB0 becomes an elliptical shape defining the X direction as the long axis direction and the Z direction as the short axis direction.

The shape conversion optical system 156 will be described using FIGS. 6 and 7.

Figure 6:
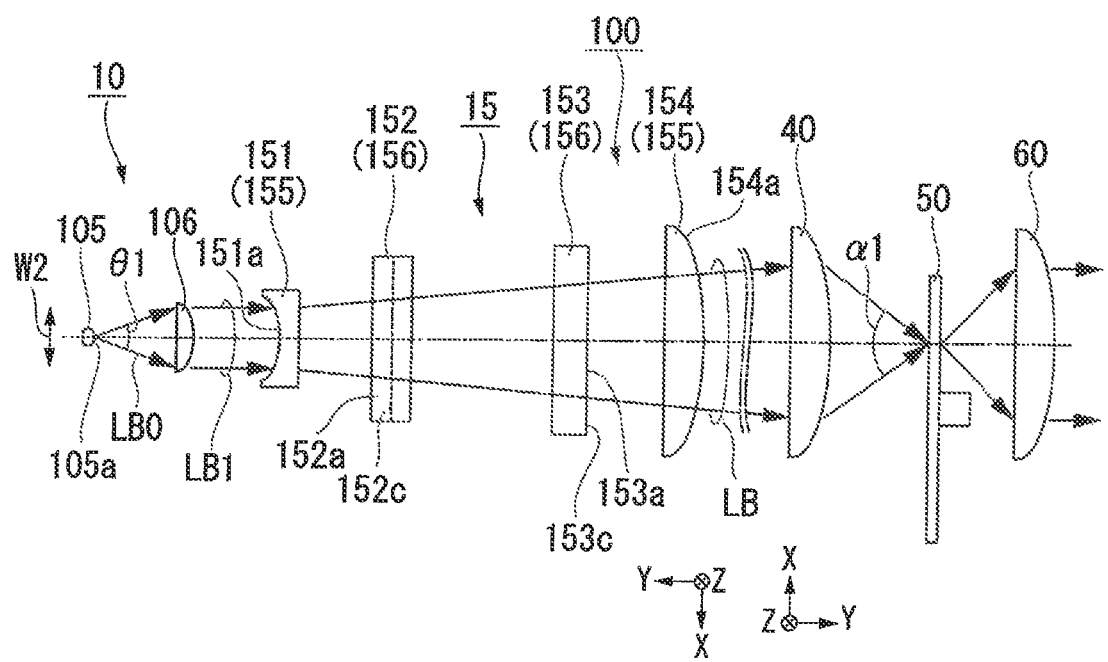
FIG. 6 is a diagram for explaining a light path of blue light in the case of viewing an illumination device from a Z direction.

FIG. 6 is a diagram for explaining a light path of the blue light beam LB0 in the case of viewing the illumination device 100 from the Z direction. FIG. 7 is a diagram for explaining the light path of the blue light beam LB0 in the case of viewing the illumination device 100 from the X direction. In FIG. 6 and FIG. 7, in order to make the description easy to understand, illustration of the first light beam combining optical system 25 and the light beam combining element 35 disposed on the light path of the blue light beam LB0 is omitted, and the light path of the blue light LB bent as shown in FIG. 2 is drawn linearly.

Figure 7:
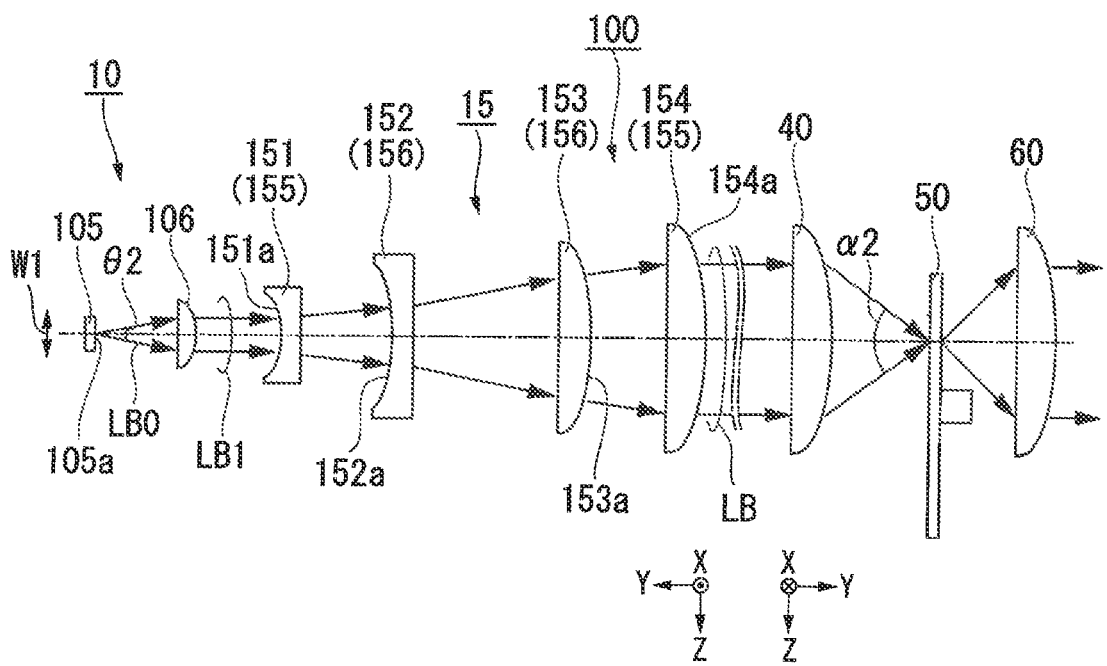
FIG. 7 is a diagram for explaining the light path of the blue light in the case of viewing the illumination device from a direction perpendicular to a Y-Z plane.

As shown in FIG. 6 and FIG. 7, the blue light beam LB0 having been emitted from the first semiconductor laser element 105 is collimated by the collimating lens 106. The blue light beam LB1 thus collimated is made larger in cross-sectional size mainly due to the action of the afocal optical system 155.

The light beam magnifying optical system 15 is further provided with the shape conversion optical system 156. The second lens 152 and the third lens 153 are disposed so that the generatrix 152c of the first cylindrical surface and the generatrix 153c of the second cylindrical surface becomes parallel to the short-side direction W2 of the light emitting area 105a of the first semiconductor laser element 105. The reason that this configuration is preferable will hereinafter be described.

As described above, the diffusion angle θ1 of the blue light beam LB0 in the short-side direction W2 of the light emitting area 105a of the first semiconductor laser element 105 is larger than the diffusion angle θ2 of the blue light beam LB0 in the longitudinal direction W1.

As shown in FIG. 6, since the second lens surface 152a and the third lens surface 153a do not have power in the X-Y plane, the shape conversion optical system 156 does not refract the blue light beam LB1. In contrast, as shown in FIG. 7, since the second lens surface 152a and the third lens surface 153a have power in the Y-Z plane, the shape conversion optical system 156 refracts the blue light beam LB1. Therefore, the shape conversion optical system 156 expands (adjusts) the cross-sectional shape of the blue light beam LB1 in a direction parallel to the generatrix 152c of the first cylindrical surface.

As described above, the blue light beam LB1 is magnified by the afocal optical system 155 in the X-Y plane, and is magnified by the afocal optical system 155 and the shape conversion optical system 156 in the Y-Z plane.

Therefore, in the light beam magnifying optical system 15, the magnifying power in the Y-Z plane smaller in diffusion angle is higher than the magnifying power in the X-Y plane larger in diffusion angle. Thus, it is possible to make the cross-sectional shape of the blue light LB, which is an elliptical shape, closer to a circular shape, and therefore, it becomes easy to reduce the color unevenness described later.

Figure 9:
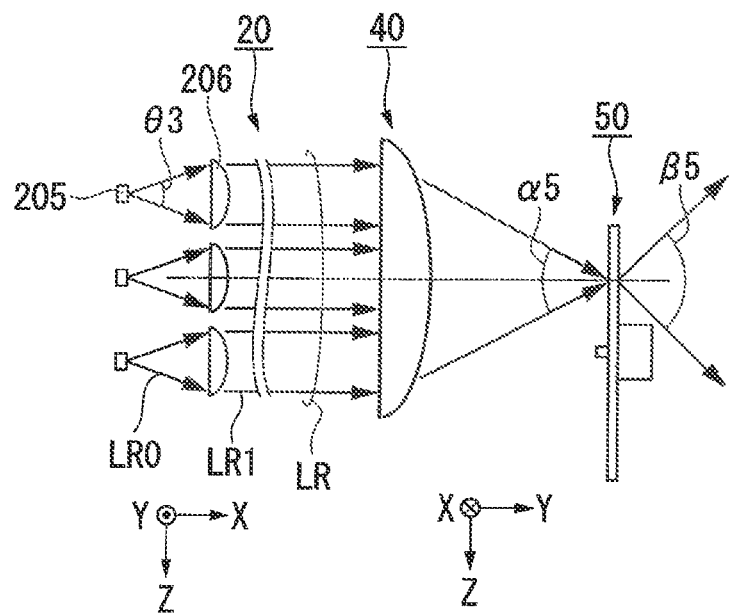
FIG. 9 is a diagram for explaining a light path of red light in the case of viewing the illumination device from a direction perpendicular to the Z direction.

FIG. 9 is a diagram for explaining a light path of the red light LR in the case of viewing the illumination device 100 from a direction perpendicular to the Z direction. In FIG. 9, in order to make the description easy to understand, illustration of the first light beam combining optical system 25 and the light beam combining element 35 disposed on the light path of the red light LR is omitted, and the light path of the red light LR bent as shown in FIG. 2 is drawn linearly.

Figure 10:
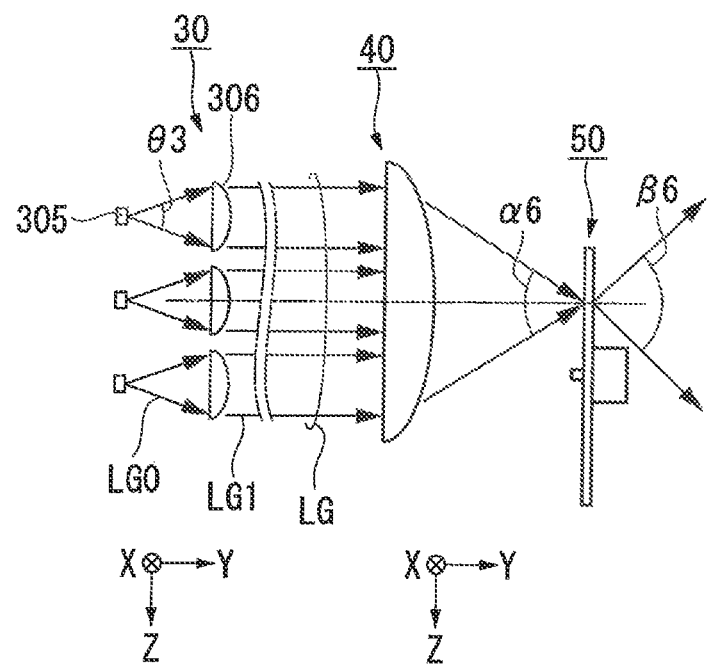
FIG. 10 is a diagram for explaining a light path of green light in the case of viewing the illumination device from a direction perpendicular to the Z direction.

FIG. 10 is a diagram for explaining the light path of the green light LG in the case of viewing the illumination device 100 from the X direction. In FIG. 10, in order to make the description easy to understand, illustration of the light beam combining element 35 disposed on the light path of the green light LG is omitted.

As shown in FIG. 9, the diffusion angle θ3 in the X-Z plane of the red light beam LR0 emitted from each of the second semiconductor laser elements 205 is in the same level as the diffusion angle θ1 of the blue light beam LB0. The cross-sectional shape of the red light beam LR1 is an elliptical shape having the long axis direction parallel to the Z direction. Although FIG. 9 shows the three red light beams LR0, in reality, the seven red light beams LR0 enter the light collection optical system 40. As shown in FIG. 10, the same as in the red light beams LR0 applies to the green light beams LG0.

In the present embodiment, as described above, the red light LR consists of the seven red light beams LR1, and the green light LG consists of the seven green light beams LG1. Therefore, the red light LR at the moment of entering the light collection optical system 40 is larger in cross-sectional size than the blue light beam LB1 at the moment of entering the light beam magnifying optical system 15. Further, the green light LG at the moment of entering the light collection optical system 40 is larger in cross-sectional size than the blue light beam LB1 at the moment of entering the light beam magnifying optical system 15.

Here, an illumination device 900 of a comparative example in which the light beam magnifying optical system 15 is removed from the illumination device 100 according to the present embodiment will be described.

Figure 11:
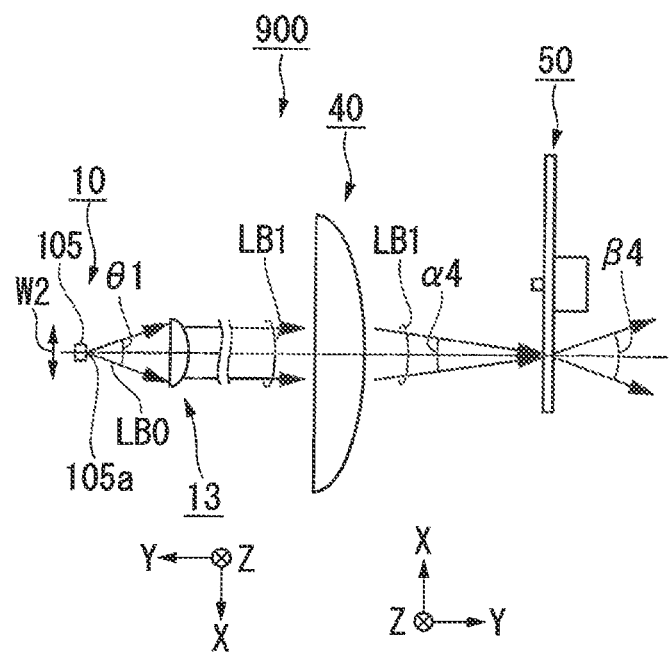
FIG. 11 is a diagram for explaining a light path of blue light in the case of viewing an illumination device of a comparative example from the Z direction.
Figure 12:
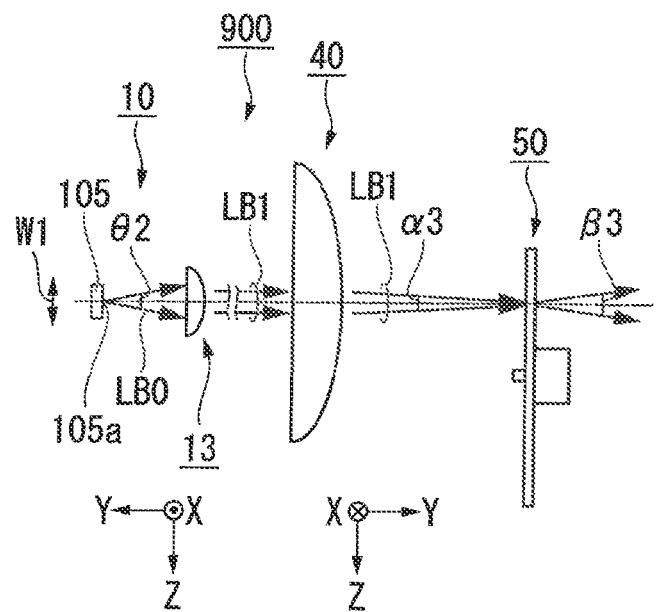
FIG. 12 is a diagram for explaining a light path of blue light in the case of viewing the illumination device of the comparative example from a direction perpendicular to the Z direction.

FIG. 11 is a diagram for explaining a light path of the blue light beam LB1 in the case of viewing the illumination device 900 of the comparative example from the Z direction. FIG. 12 is a diagram for explaining the light path of the blue light beam LB1 in the case of viewing the illumination device 900 of the comparative example from a direction perpendicular to the Y-Z plane.

As shown in FIG. 11 and FIG. 12, in the case of the illumination device 900 according to the comparative example, the blue light beam LB1 enters the light collection optical system 40 without being increased in cross-sectional size by the light beam magnifying optical system 15. The larger in cross-sectional size the blue light beam LB1 before entering the light collection optical system 40 is, the larger the distribution range of the incident angle in the case in which the blue light beam LB1 enters the diffusion element 50 is.

Regarding the red light LR and the green light LG, the illumination device 900 according to the comparative example has the same configuration as that of the illumination device 100 according to the present embodiment. Therefore, as shown in FIG. 9 and FIG. 10, the red light LR and the green light LG enter the light collection optical system 40 in the state of being larger in cross-sectional size than the blue light beam LB1, and are then collected to enter the diffusion element 50. Therefore, the distribution range α5 of the incident angle in the case in which the red light LR enters the diffusion element 50 and the distribution range α6 of the incident angle in the case in which the green light LG enters the diffusion element 50 are larger than either of the distribution ranges α3, α4 of the incident angle in the case in which the blue light beam LB1 enters the diffusion element 50. In the configuration of the present embodiment, since all of the colored light beams enter the common light collection optical system 40, the diffusion angle β5 in the case in which the red light LR is emitted from the diffusion element 50 and the diffusion angle β6 in the case in which the green light LG is emitted from the diffusion element 50 are larger than either of the diffusion angles β3, β4 in the case in which the blue light LB is emitted from the diffusion element 50 reflecting the distribution ranges of the incident angles.

As described above, in the illumination device 900 according to the comparative example, due to the plurality of colored light beams different in diffusion angle from each other entering the optical system in the posterior stage such as an integrator optical system, the color unevenness occurs.

In contrast, since the illumination device 100 according to the present embodiment is provided with the light beam magnifying optical system 15 as shown in FIG. 6 and FIG. 7, the blue light LB is larger in cross-sectional size than the blue light beam LB1. Specifically, the light beam magnifying optical system 15 increases the cross-sectional size of the blue light beam LB1 so that the difference in cross-sectional size between the red light LR when entering the light collection optical system 40 and the blue light LB when entering the light collection optical system 40 is smaller than the difference in cross-sectional size between the red light LR when entering the light collection optical system 40 and the blue light beam LB1 when entering the light beam magnifying optical system 15.

Further, by arbitrarily adjusting the magnifying power of the blue light beam LB2 by the light beam magnifying optical system 15, it is possible to make the cross-sectional sizes of the blue light LB and the red light LR when entering the light collection optical system 40 roughly equal to each other. It should be noted that although the relationship between the blue light LB and the red light LR is described above, the same applies to the relationship between the blue light LB and the green light LG.

In this case, since the distribution ranges of the incident angles when the respective colored light beams enter the diffusion element 50 become roughly equal to each other, the diffusion angles when the respective colored light beams are emitted from the diffusion element 50 are also made roughly equal to each other. Therefore, a spot of the red light LR, a spot of the green light LG, and a spot of the blue light LB each formed on the first lens array 71 are roughly the same in size as each other. Therefore, according to the projector 1 equipped with the illumination device 100 according to the present embodiment, it is possible to display an image with the color unevenness reduced.

Further, in the light beam magnifying optical system 15, since the shape conversion optical system 156 is disposed between the first lens surface 151a and the fourth lens surface 154a constituting the afocal optical system 155, it is possible to miniaturize the illumination device 100 compared to the case in which the afocal optical system and the optical system for adjusting the shape are disposed in series to each other. Thus, it is possible to provide a small-sized illumination device 100 capable of increasing the cross-sectional size of the light without degrading the parallelism of the light while adjusting the cross-sectional shape of the light.

Further, in the light beam magnifying optical system 15 of the present embodiment, since the first lens surface 151a and the second lens surface 152a have the negative power, and the third lens surface 153a and the fourth lens surface 154a have the positive power, it is possible to make the light path length in the light beam magnifying optical system 15 shorter compared to the case in which all of these lens surfaces have the positive power.

Further, in the illumination device 900 according to the comparative example not provided with the light beam magnifying optical system 15, in order to reduce the difference in diffusion angle between the plurality of colored light beams, it is necessary to separately provide a diffusion element for the blue light higher in diffusive power than the diffusion element for the red light or the green light. In that case, there occur problems such as an increase in loss of the blue light, an increase in the number of components, and growth in size of the illumination device. In contrast, in the illumination device 100 according to the present embodiment, since the single diffusion element 50 can be used in common by all of the colored light beams, there is no chance for the problems described above to occur.

Second Embodiment

Hereinafter, a second embodiment of the invention will be described using FIG. 13 and FIG. 14.

The basic configuration of a projector and an illumination device according to the second embodiment is roughly the same as that in the first embodiment, and the configuration of the light beam magnifying optical system is different from that of the first embodiment. Therefore, the description of the whole of the projector and the illumination device will be omitted, and only the light beam magnifying optical system will be described.

Figure 13:
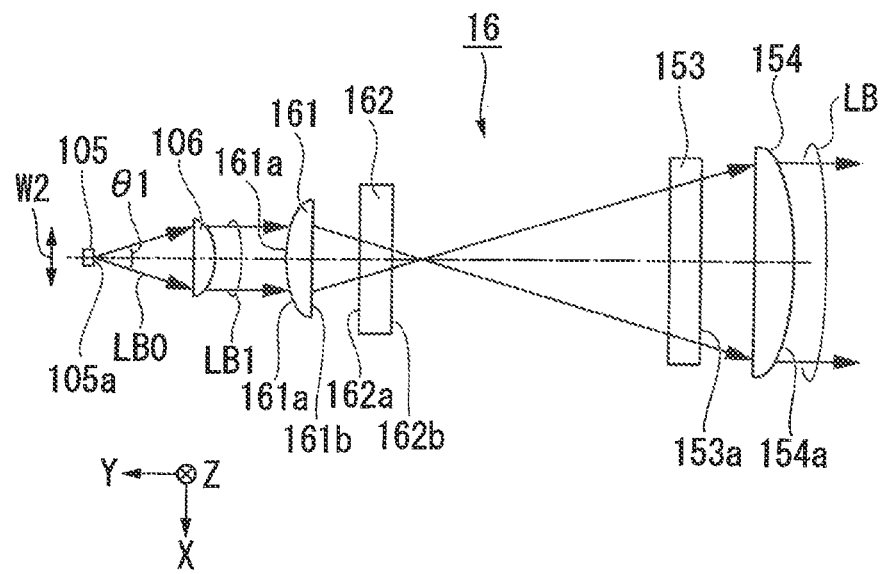
FIG. 13 is a diagram of a light beam magnifying optical system of a second embodiment of the invention viewed from the Z direction.

FIG. 13 is a diagram of the light beam magnifying optical system of the second embodiment viewed from the Z direction. FIG. 14 is a diagram of the light beam magnifying optical system of the second embodiment viewed from the X direction.

Figure 14:
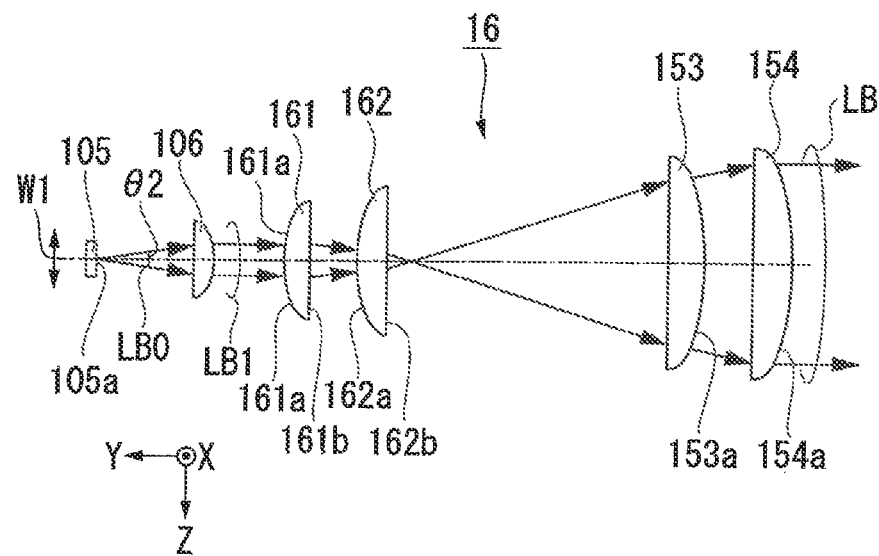
FIG. 14 is a diagram of the light beam magnifying optical system of the second embodiment viewed from a direction perpendicular to the Z direction.

In FIG. 13 and FIG. 14, the constituents common to the drawings used in the first embodiment are denoted by the same reference symbols, and the description thereof will be omitted.

As shown in FIG. 13 and FIG. 14, a light beam magnifying optical system 16 of the present embodiment includes a first lens surface 161a, a second lens surface 162a, the third lens surface 153a, and the fourth lens surface 154a disposed in sequence from the incident side of the blue light beam LB1. Further, the light beam magnifying optical system 16 is provided with a first lens 161, a second lens 162, the third lens 153, and the fourth lens 154 disposed in sequence from the incident side of the blue light beam LB1. The first lens surface 161a is provided to the first lens 161, the second lens surface 162a is provided to the second lens 162, the third lens surface 153a is provided to the third lens 153, and the fourth lens surface 154a is provided to the fourth lens 154.

The first lens 161 is constituted by a plano-convex lens having the first lens surface 161a formed of a convex surface and a plane 161b. Further, the first lens surface 161a is formed of a spherical surface having positive power.

The second lens 162 is constituted by a plano-convex lens having the second lens surface 162a formed of a convex surface and a plane 162b. Further, the second lens surface 162a is formed of a first anamorphic surface having positive power. In other words, the sign of the power of the second lens surface 162a is the same as the sign of the power of the first lens surface 161a. Further, the first anamorphic surface is formed of a first cylindrical surface.

The third lens 153 and the fourth lens 154 are substantially the same as those in the first embodiment.

Also in the present embodiment, there can be obtained substantially the same advantages as in the first embodiment, namely it is possible to provide the small-sized illumination device capable of increasing the cross-sectional size of the light without degrading the parallelism of the light while adjusting the cross-sectional shape of the light, and it is possible to provide the projector little in the color unevenness of an image.

Third Embodiment

Hereinafter, a third embodiment of the invention will be described using FIG. 15 and FIG. 16.

The basic configuration of a projector and an illumination device according to the third embodiment is roughly the same as that in the first embodiment, and the configuration of the light beam magnifying optical system is different from that of the first embodiment. Therefore, the description of the whole of the projector and the illumination device will be omitted, and only the light beam magnifying optical system will be described.

Figure 15:
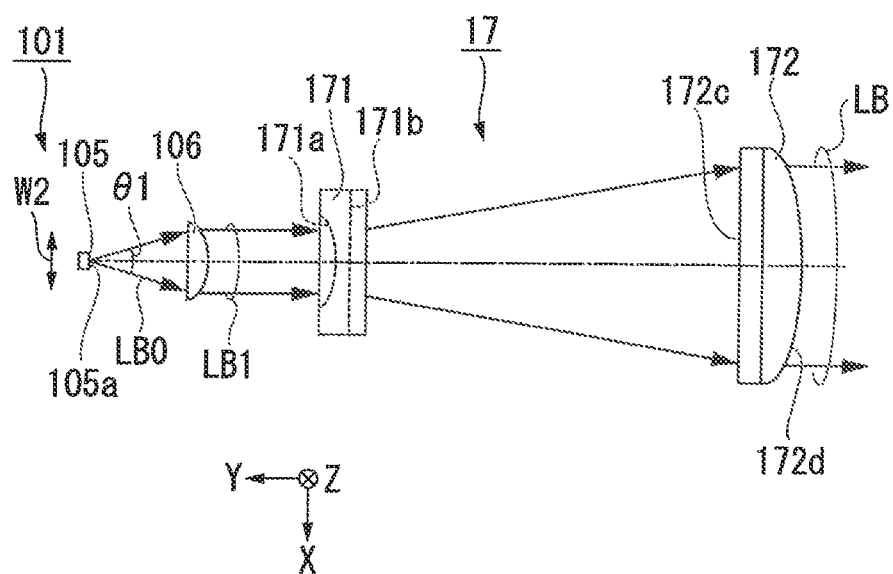
FIG. 15 is a diagram of a light beam magnifying optical system of a third embodiment of the invention viewed from the Z direction.

FIG. 15 is a diagram of the light beam magnifying optical system of the third embodiment viewed from the Z direction. FIG. 16 is a diagram of the light beam magnifying optical system of the third embodiment viewed from the X direction.

Figure 16:
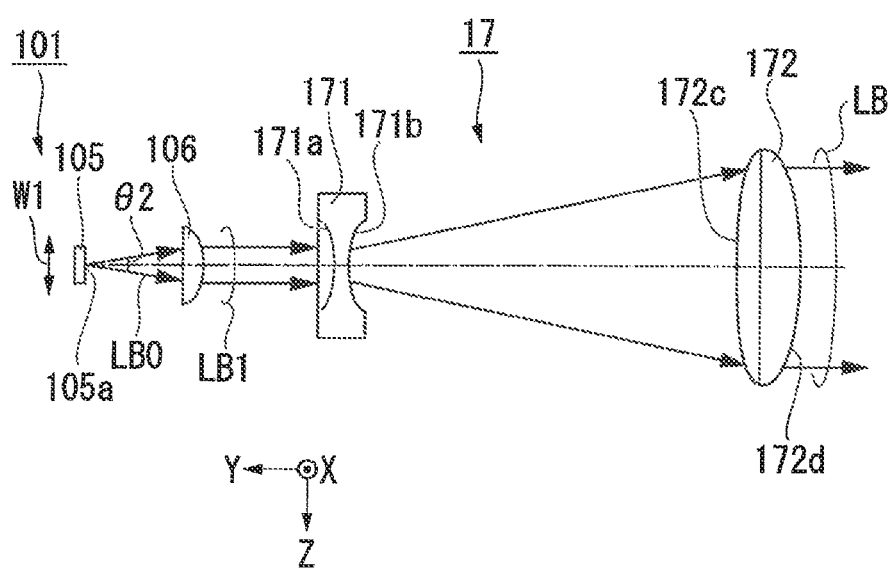
FIG. 16 is a diagram of the light beam magnifying optical system of the third embodiment viewed from a direction perpendicular to the Z direction.

In FIG. 15 and FIG. 16, the constituents common to the drawings used in the first embodiment are denoted by the same reference symbols, and the description thereof will be omitted.

As shown in FIG. 15 and FIG. 16, a light beam magnifying optical system 17 of the present embodiment includes a first lens surface 171a, a second lens surface 171b, a third lens surface 172c, and a fourth lens surface 172d disposed in sequence from the incident side of the blue light beam LB1. The light beam magnifying optical system 17 is provided with a first lens 171 and a second lens 172 disposed in sequence from the incident side of the blue light beam LB1. The first lens surface 171a and the second lens surface 171b are provided to the first lens 171. The third lens surface 172c and the fourth lens surface 172d are provided to the second lens 172.

The first lens 171 is formed of a biconcave lens having the first lens surface 171a (a concave surface) opposed to the first light emitting element 101, and the second lens surface 171b (a concave surface) opposed to the second lens 172. The first lens surface 171a is formed of a spherical surface having negative power. The second lens surface 171b is formed of a first anamorphic surface having negative power. Further, the first anamorphic surface is formed of a first cylindrical surface.

The second lens 172 is formed of a biconvex lens having the third lens surface 172c (a convex surface) opposed to the first lens 171, and the fourth lens surface 172d (a convex surface) opposed to the first light beam combining optical system 25 (see FIG. 2). The third lens surface 172c is formed of a second anamorphic surface having positive power. Further, the second anamorphic surface is formed of a second cylindrical surface. The fourth lens surface 172d is formed of a spherical surface having positive power.

Also in the present embodiment, there can be obtained substantially the same advantages as in the first embodiment, namely it is possible to provide the small-sized illumination device capable of increasing the cross-sectional size of the light without degrading the parallelism of the light while adjusting the cross-sectional shape of the light, and it is possible to provide the projector little in the color unevenness of an image.

Further, in the case of the present embodiment, since the light beam magnifying optical system 17 is constituted by the first lens 171 and the second lens 172, it is possible to reduce the number of the components, and it is possible to shorten the light path length in the light beam magnifying optical system 17 compared to the first and second embodiments.

It should be noted that the scope of the invention is not limited to the embodiment described above, but various modifications can be provided thereto within the scope or the spirit of the invention.

For example, although in the embodiments described above, the first anamorphic surface and the second anamorphic surface of the light beam magnifying optical system are each formed of a cylindrical surface, a configuration in which at least one of the first anamorphic surface and the second anamorphic surface has refractive power in both of the X-Y plane and the Y-Z plane can also be adopted instead of the configuration described above. In this case, it is desirable for the refractive power in the Y-Z plane to be higher than the refractive power in the X-Y plane. According to this configuration, it is possible to compensate for the lack of the power of the afocal optical system 155.

Further, the number, the arrangement, the shape, the material, the dimensions and so on of the constituents of the light source section, the illumination device and the projector can arbitrarily be modified.

Although in the embodiments described above, there is illustrated the projector provided with the three light modulation devices, the invention can also be applied to a projector for displaying a color image using a single light modulation device. Further, a digital mirror device can also be used as the light modulation device.

Further, although in the embodiments described above, there is described the example of applying the illumination device according to the invention to the projector, the invention is not limited to this example. The illumination device according to the invention can also be applied to lighting equipment such as a headlight for a vehicle.

The entire disclosure of Japanese Patent Application No. 2017-158838, filed on Aug. 21, 2017 is expressly incorporated by reference herein.

What is claimed is:

1. An illumination device comprising:
a first light source section which has at least one first light emitting element adapted to emit first colored light collimated, and is adapted to emit first light including the first colored light; and
a light beam magnifying optical system adapted to magnify the first light,
wherein the light beam magnifying optical system includes a first lens surface, a second lens surface, a third lens surface, and a fourth lens surface disposed in sequence from an incident side of the first light,
the first lens surface is formed of a spherical surface having power,
the second lens surface is formed of a first anamorphic surface having power with the same sign as a sign of the power of the first lens surface,
the third lens surface is formed of a second anamorphic surface having positive power,
the fourth lens surface is formed of a spherical surface having positive power, and
the light beam magnifying optical system includes a first lens having the first lens surface and the second lens surface, and a second lens having the third lens surface and the fourth lens surface.

2. The illumination device according to claim 1, wherein the first anamorphic surface is formed of a first cylindrical surface, and
the second anamorphic surface is formed of a second cylindrical surface.

3. The illumination device according to claim 2, wherein the first light emitting element includes a semiconductor laser element, and
a generatrix of the first cylindrical surface and a generatrix of the second cylindrical surface are parallel to a short-side direction of a light emitting area of the semiconductor laser element.

4. An illumination device comprising:
a first light source section which has at least one first light emitting element adapted to emit first colored light collimated, and is adapted to emit first light including the first colored light;
a light beam magnifying optical system adapted to magnify the first light, and
a second light source section which has a plurality of second light emitting elements adapted to emit second colored light collimated and different in color from the first colored light, and is adapted to emit second light including the second colored light,
wherein the light beam magnifying optical system includes a first lens surface, a second lens surface, a third lens surface, and a fourth lens surface disposed in sequence from an incident side of the first light, the first lens surface is formed of a spherical surface having power,
the second lens surface is formed of a first anamorphic surface having power with the same sign as a sign of the power of the first lens surface,
the third lens surface is formed of a second anamorphic surface having positive power,
the fourth lens surface is formed of a spherical surface having positive power,
the number of the second light emitting elements is larger than the number of the first light emitting elements,
the second light is larger in cross-sectional size than the first light, and
the light beam magnifying optical system has a function of increasing the cross-sectional size of the first light so that a difference in cross-sectional size between the second light and the first light in a posterior stage of the light beam magnifying optical system is smaller than a difference in cross-sectional size between the second light and the first light in an anterior stage of the light beam magnifying optical system.

5. The illumination device according to claim 4, further comprising:
a first light beam combining optical system having a function of combining the first light having been transmitted through the light beam magnifying optical system and the second light; and
a diffusion element where light emitted from the first light beam combining optical system enters.

6. A projector comprising:
the illumination device according to claim 1;
a light modulation section adapted to modulate the first light from the illumination device in accordance with image information to thereby form image light; and
a projection optical system adapted to project the image light.

7. A projector comprising:
the illumination device according to claim 2;
a light modulation section adapted to modulate the first light from the illumination device in accordance with image information to thereby form image light; and
a projection optical system adapted to project the image light.

8. A projector comprising:
illumination device according to claim 3;
a light modulation section adapted to modulate the first light from the illumination device in accordance with image information to thereby form image light; and
a projection optical system adapted to project the image light.

9. A projector comprising:
the illumination device according to claim 4;
a light modulation section adapted to modulate the first light from the illumination device in accordance with image information to thereby form image light; and
a projection optical system adapted to project the image light.

10. A projector comprising:
the illumination device according to claim 5;
a light modulation section adapted to modulate the first light from the illumination device in accordance with image information to thereby form image light; and
a projection optical system adapted to project the image light.

* * * * *